Nov. 4, 1952   C. B. DOTY ET AL   2,616,757
AUTOMOBILE BODY FRONT PILLAR AND FENDER MOUNTING MEANS
Filed Nov. 23, 1946   2 SHEETS—SHEET 1
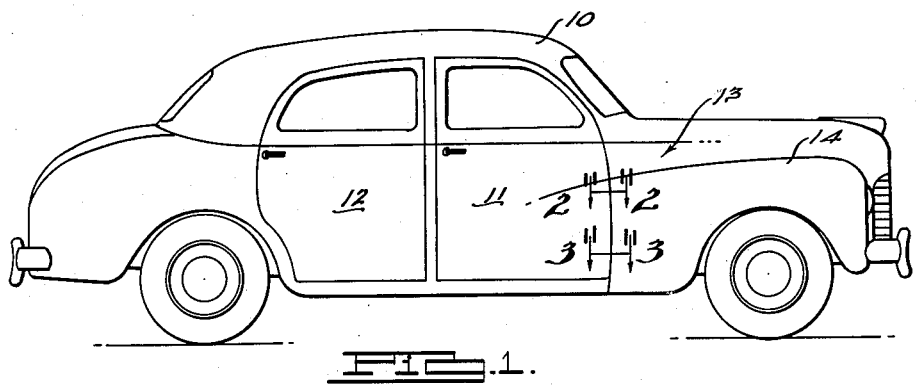
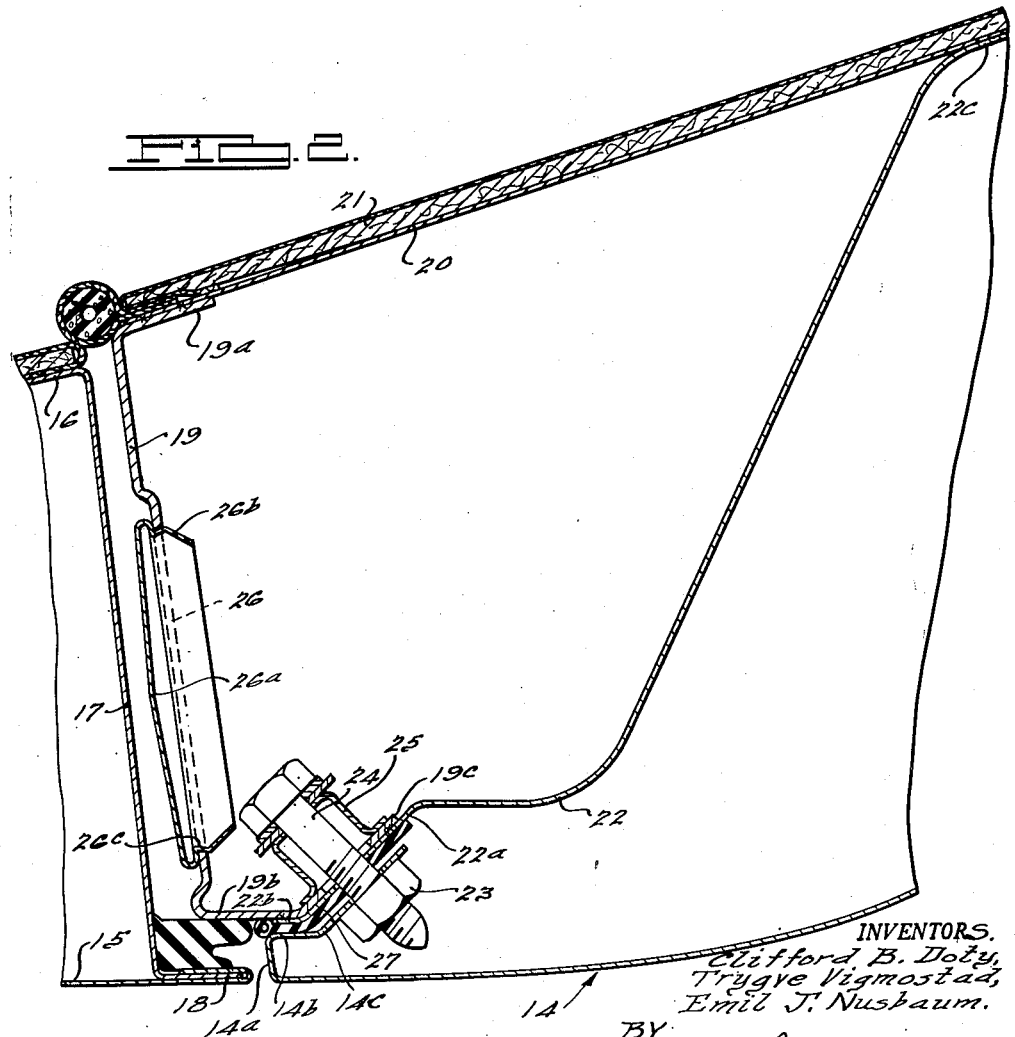
INVENTORS.
Clifford B. Doty,
Trygve Vigmostad,
Emil J. Nusbaum.
BY Elmer Jamison Gray
ATTORNEY.

Nov. 4, 1952  C. B. DOTY ET AL  2,616,757
AUTOMOBILE BODY FRONT PILLAR AND FENDER MOUNTING MEANS
Filed Nov. 23, 1946  2 SHEETS—SHEET 2
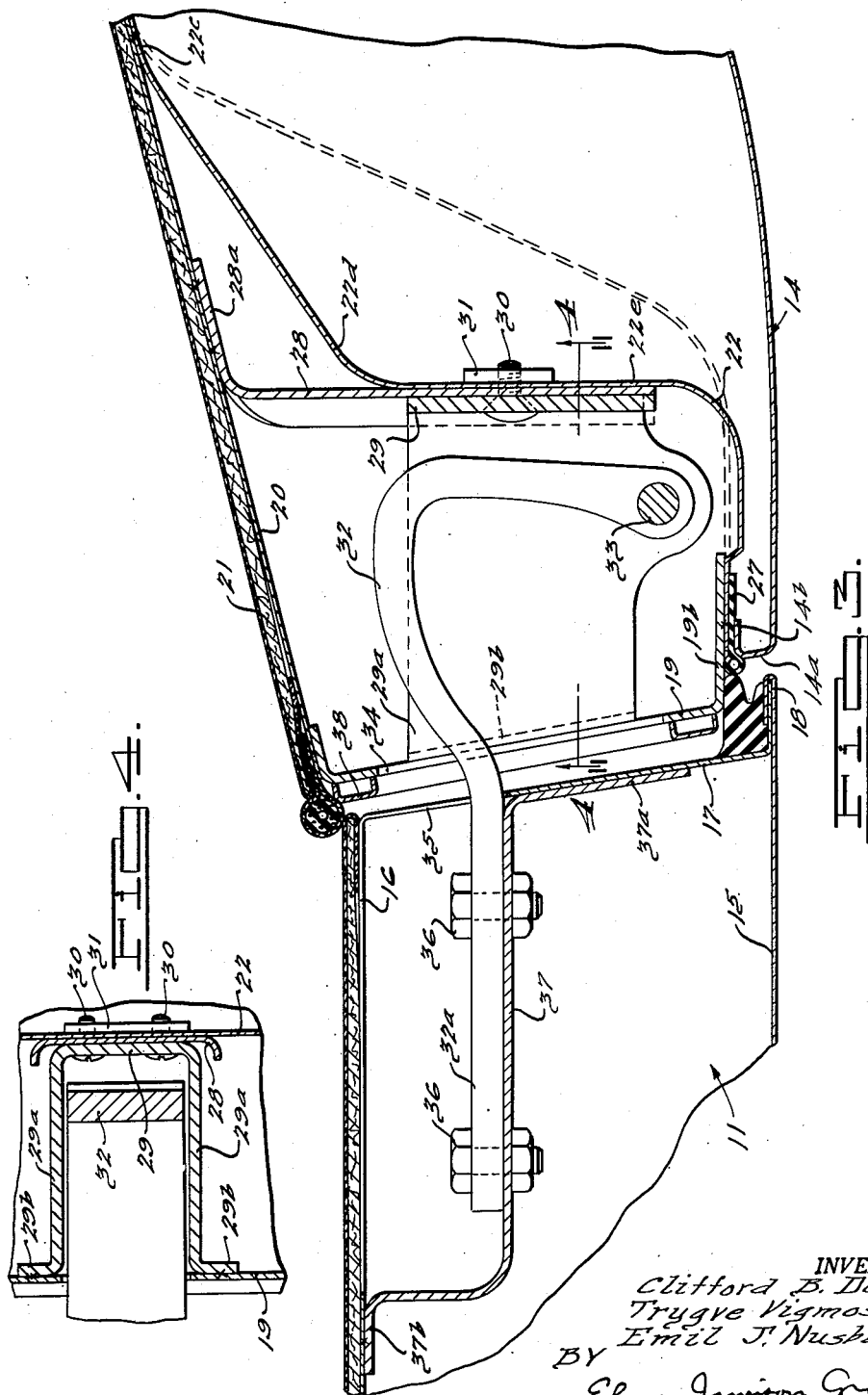
INVENTORS.
Clifford B. Doty,
Trygve Vigmostad,
Emil J. Nusbaum.
BY
Elmer Jamison Gray
ATTORNEY.

Patented Nov. 4, 1952

2,616,757

UNITED STATES PATENT OFFICE 2,616,757

AUTOMOBILE BODY FRONT PILLAR AND FENDER MOUNTING MEANS

Clifford B. Doty, Trygve Vigmostad, and Emil J. Nusbaum, Detroit, Mich., assignors to Briggs Manufacturing Company, Detroit, Mich., a corporation of Michigan Application November 23, 1946, Serial No. 712,012

7 Claims. (Cl. 296—28)

This invention relates to vehicle bodies, such as automobile bodies, and concerns particularly the fabrication and construction of the front side assembly, the associated front door hinge mounting and the mounting for the front fender.

An object of the invention is to improve the construction of an automobile body or the like by providing improved, simplified and easily accessible means for detachably mounting the front fender on the front portion of the body adjacent the door.

A further object of the invention is to provide an improved detachable mounting for the front fender of an automobile body, the construction and arrangement being such that the attaching bolts for the rear upright edge of the fender are readily accessible through apertures in the jamb face or edge of the front pillar, these apertures being preferably closed by means of removable caps which are concealed and inaccessible when the front door is closed.

Another object of the invention is to provide improvements in the construction of the front pillar of the body to which the front door is hinged, the pillar comprising an upright jamb member together with inside and outside cowl panels which form therewith a generally box-like section of strong and rigid construction.

Still another object of the invention is to provide improved means for hinging the front door to the front body pillar, the latter being of strong and rigid construction by reason of its box-like construction and the door hinge being mounted within the pillar in improved manner.

The above and other objects and advantages of the present invention will appear from the following description and appended claims when considered in connection with the accompanying drawings forming a part of this specification wherein like reference characters designate corresponding parts in the several views.

Fig. 1 is a side elevation of an automobile body incorporating the present invention.

Fig. 2 is an enlarged horizontal section taken substantially through lines 2—2 of Fig. 1 looking in the direction of the arrows.

Fig. 3 is an enlarged horizontal section taken substantially through lines 3—3 of Fig. 1 looking in the direction of the arrows.

Fig. 4 is a section taken substantially through lines 4—4 of Fig. 3 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In Fig. 1 of the drawings there is illustrated, by way of example, an automobile body of suitable design comprising a roof assembly formed principally from a one-piece pressed metal roof panel, side assemblies attachable to the roof panel and having door openings to receive front and rear doors 11 and 12, respectively, and a front cowl structure forming part of the side assembly and generally indicated at 13. Detachably mounted upon the body at each side thereof is a front fender 14. Although the present automobile body is illustrated as being of the four-door type, it will be understood that the invention is equally applicable to automobile bodies of the two-door type.

Referring to Figs. 2 and 3, each front door 11 comprises spaced outside and inside pressed metal door panels 15 and 16, respectively, the inner door panel at its forward edge being extended transversely to provide a door jamb 17 joined to the outer door panel 15 by the usual overlap flange 18.

The front end of the body at each side thereof is provided with a door frame which includes a vertically extending pillar jamb member 19 extending from the floor pan upwardly along the side of the windshield and merging into the door header structure, this pillar member 19 being channel-shaped as shown in Figs. 2 and 3 and terminating at its inner and outer edges in forwardly extending side flanges 19a and 19b. The rear edge of an inside pressed metal cowl panel 20 overlaps the flange 19a and is spot-welded thereto. This inside cowl panel is trimmed in any suitable manner within the forward tonneau of the body in rear of the dash such as by means of a trim panel 21.

The front pillar structure at each side of the body also comprises an outside pressed metal cowl panel 22. This cowl panel is formed at suitable intervals in its height with inwardly extending indentations or embossments forming flat angularly extending wall portions 22a arranged in juxtaposed relation to correspondingly inclined flange portions 19c pressed from the metal of the pillar member 19. Thus, as shown in Fig. 2, the several projecting flange portions 19c abut against the wall portions 22a of the outside cowl panel and are spot-welded thereto. The rear edge 22b of the outside cowl panel 22 lies in juxtaposed relation to the flange 19b and is spot-welded thereto at this locality. It will be seen that the outside cowl panel 22 extends inwardly at an angle to meet the inside cowl panel 20 and terminates in a flange 22c abutting against the inside cowl panel and spot-welded thereto. From the foregoing construction it will be seen that the pillar jamb member 19, the inside cowl panel 20, and the outside cowl panel 22 form in effect a box-like structure which imparts considerable strength and rigidity to the front end of the vehicle body.

Each front fender 14 is in the form of a unitary sheet metal stamping, the outer wall of which extends substantially flush with the outer panel 15 of the door. The fender terminates at its rear edge adjacent the edge of the overlap flange 18 with an inwardly extending flange 14a which has a depth somewhat less than the distance between the overlap flange 18 and the pillar flange 19b. At the inner edge of the flange 14a the metal of the fender is return-bent to provide a forwardly extending flange 14b arranged parallel to the pillar flange 19b. This flange 14b is formed at intervals at the locality of the embossments 22a with attaching flange extensions 14c, each of which is adapted to extend within each of the embossments or recesses 22a in the outside cowl panel. Rigidly secured to each flange portion 14c is a nut 23 adapted to receive a bolt 24. In attaching the fender in place the bolt is passed through an aperture in a U-shaped spacer member 25 spot-welded to the flange 19c and through an aperture in the wall 22a, the bolt being threaded through the nut 23 and the head of the bolt being drawn down tightly against washers, including a lock washer, interposed between the bolt head and the spacer member 25.

It will be noted that the axis of the bolt 24 extends angularly with respect to the pillar jamb member 19 and an important feature of the invention resides in the fact that each bolt 24 is accessible for attachment through an aperture 26 in the pillar jamb member 19. Thus, in assembling the fender with the body the workman may insert the bolts 24 through the apertures 26 in the pillar member and may draw down the bolts tightly by inserting a wrench through the apertures. After the fender has been attached along its rear edge by means of the bolts 24, the apertures 26 may be closed by means of disk-like caps 26a. Each cap has a tapered spring flange 26b terminating in an annular seat 26c to receive the edge of the aperture 26 after the cap has been forced into position as shown in Fig. 2. A suitable sealing strip 27 is interposed between the rear inturned edge of the fender and the adjacent surface of the outside cowl panel 22 when the fender is bolted in position.

In Figs. 3 and 4 the construction of the front pillar and fender is illustrated at the locality of the lower hinge mounting for the door, this construction being substantially the same at the locality of the upper hinge mounting. The outside cowl panel 22, at the locality of the hinge mounting, is embossed inwardly at 22d thereby providing a flat transverse wall portion 22e engaging the flat face of an outwardly extending hinge reinforcing angle bracket 28 which is preferably channel-shaped in cross-section. This bracket terminates at its inner end in a forwardly extending attaching flange 28a spot-welded to the inside cowl panel 20. A channel-shaped hinge support 29 has its central web engaging the rear face of the bracket 28, and this hinge support is secured to the bracket and to the wall portion 22e of the outside cowl panel by means of cap screws 30 threaded into tapped holes in a reinforcing piece 31 secured to the outside cowl panel. The hinge support 29 is formed with spaced sides 29a terminating at their rear edges in turned flanges 29b spot-welded to the pillar jamb member 19. The front door hinge member 32 is adapted to swing between the sides 29a of the hinge support and is pivoted thereto at 33.

The hinge member 32 extends through a slot 34 in the pillar member 19 and thence through a slot 35 in the door jamb 17. The extended portion 32a of the hinge member is bolted at 36 to a reinforcing bracket 37 mounted between the inner and outer door panels. This bracket has an outwardly extending flange 37a spot-welded to the inside of the door jamb 17 and at its opposite end is flanged at 37b for attachment by spot-welding to the inner door panel 16. Extending around the border of the slot 34 in the pillar jamb 19 is a flanged hinge face plate 38 which is spot-welded to the pillar jamb 19 around the edges of the hinge slot 34 therein.

We claim:

1. In a vehicle body, a front pillar structure comprising an upright pillar member having a transverse door jamb, an aperture in said jamb, a cowl panel, said pillar member and cowl panel having overlapping portions, a separable front fender having a portion overlapping the aforesaid portions, and means accessible through said aperture for detachably securing said fender portion to said overlapping portions of the cowl panel and pillar member.

2. In a vehicle body, a front pillar structure having a transverse jamb, said jamb having a forwardly and inwardly extending flange portion at its outer edge, a cowl panel having a portion overlapping said flange portion, a front fender having a flange overlapping said flange portion, an aperture in said jamb, and means accessible through said aperture for detachably securing said fender flange to said overlapping cowl panel and flange portions.

3. In a vehicle body, an upright front pillar member forming a door jamb face and having a flange along its outer edge extending angularly forward and inward, a front fender having a rear flange extending forward and inward adjacent said pillar flange in overlapping mutually supporting relation, and means detachably securing said flanges together.

4. In a vehicle body, a front pillar structure comprising an upright pillar member having a transverse door jamb terminating at its outer edge in a forwardly and inwardly extending flange portion, a fender having its rear edge formed with a forwardly and inwardly extending flange portion arranged in overlapping mutually supporting relation to said first named flange portion, and means accessible through an opening in said jamb for attaching said flanges together.

5. In a vehicle body, an upright door pillar member, an inside cowl panel, an outside cowl panel, said member and panels being secured together to form a box-like pillar structure, a bracket secured at transversely spaced points to said panels and disposed within said pillar structure, a door hinge mounting secured to said bracket, said pillar member and outside cowl panel having overlapping portions, a front fender having a rear edge portion attachable to said overlapping portions, and means accessible through an aperture in said pillar member at the jamb face thereof for detachably securing said fender portion to said portions of the pillar member and cowl panel.

6. In a vehicle body, a front pillar structure comprising an upright pillar member having a transverse jamb terminating at its outer edge in a forwardly and inwardly extending flange portion, a cowl panel having a portion disposed opposite said flange portion, a fender having a flange disposed opposite said flange portion, said jamb having an aperture, a bolt having its axis extending through said aperture and accessible therethrough for detachably securing said fender flange to said cowl panel and flange portions.

7. In a vehicle body, an upright door pillar member, an inside cowl panel, an outside cowl panel, said member and panels being secured together to form a box-like pillar structure, a bracket secured at transversely spaced points to said panels and disposed within said pillar structure, a door hinge mounting secured to said bracket, said pillar member and outside cowl panel having overlapping portions positioned for securement thereto of a front fender, and a front fender having a rear edge portion secured to said overlapping portions in mutually supporting relation.

CLIFFORD B. DOTY.
TRYGVE VIGMOSTAD.
EMIL J. NUSBAUM.

REFERENCES CITED

The following references are of record in the file of this patent:

UNITED STATES PATENTS

| Number | Name | Date |
|---|---|---|
| 1,158,438 | Buch | Nov. 2, 1915 |
| 1,696,955 | Hughes | Jan. 1, 1929 |
| 1,844,966 | Ledwinka | Feb. 16, 1932 |
| 2,075,936 | Graebner et al. | Apr. 6, 1937 |
| 2,143,736 | Lefevre | Jan. 10, 1939 |
| 2,171,412 | Brown | Aug. 29, 1939 |
| 2,188,891 | Haltenberger | Jan. 30, 1940 |
| 2,199,036 | Best | Apr. 30, 1940 |
| 2,219,821 | Schonitzer | Oct. 29, 1940 |
| 2,284,320 | Howe | May 26, 1942 |
| 2,362,077 | Ledwinka et al. | Nov. 7, 1944 |
| 2,383,428 | Ulrich | Aug. 21, 1945 |
| 2,394,014 | Schonitzer | Feb. 5, 1946 |
| 2,404,870 | Ulrich | July 30, 1946 |